Dec. 15, 1959  J. S. PARSONS  2,916,825
DISPLAY FOR A NAVIGATIONAL INSTRUMENT
Filed May 8, 1953  2 Sheets-Sheet 2
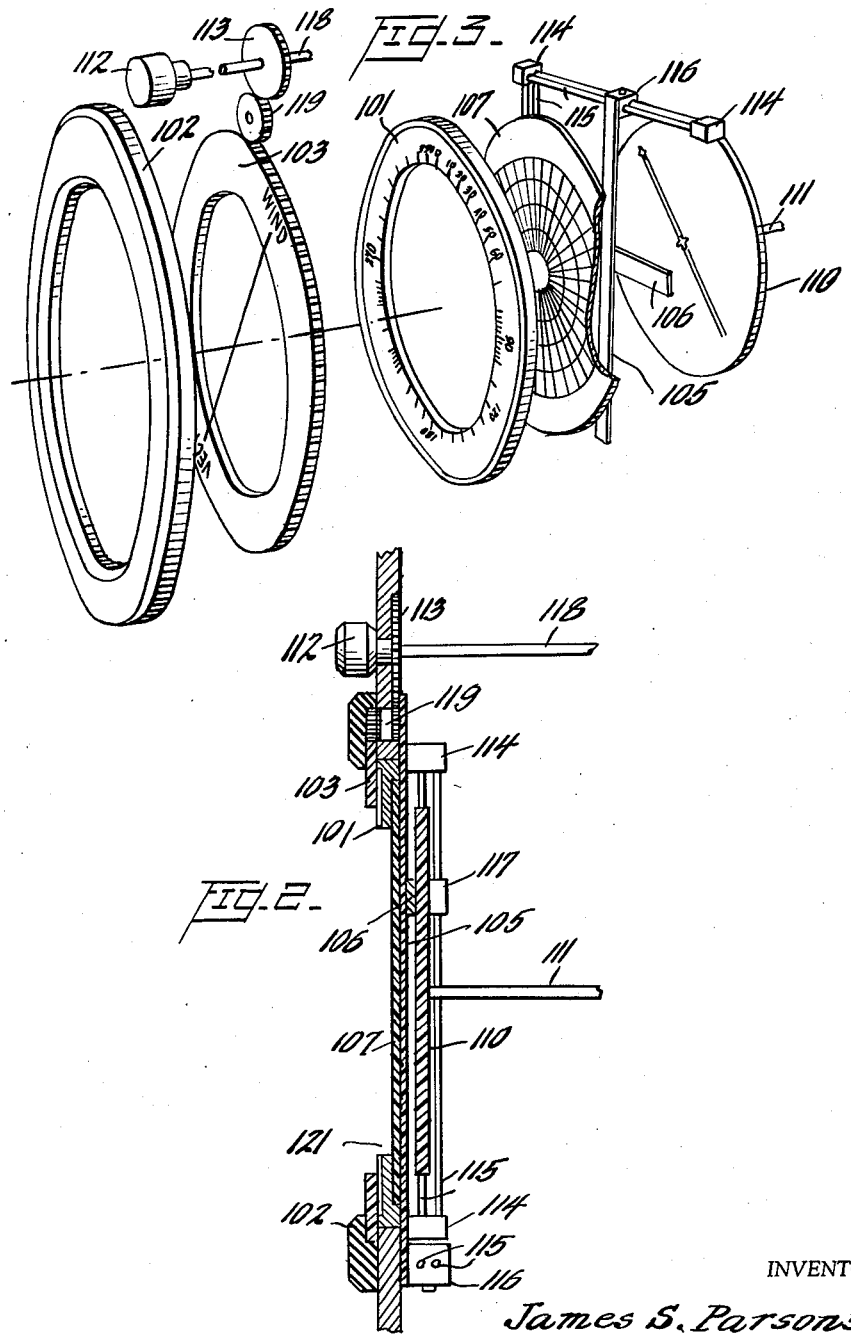
INVENTOR
James S. Parsons,
BY Watson, Cole, Grindle & Watson
ATTORNEYS United States Patent Office 2,916,825
Patented Dec. 15, 1959

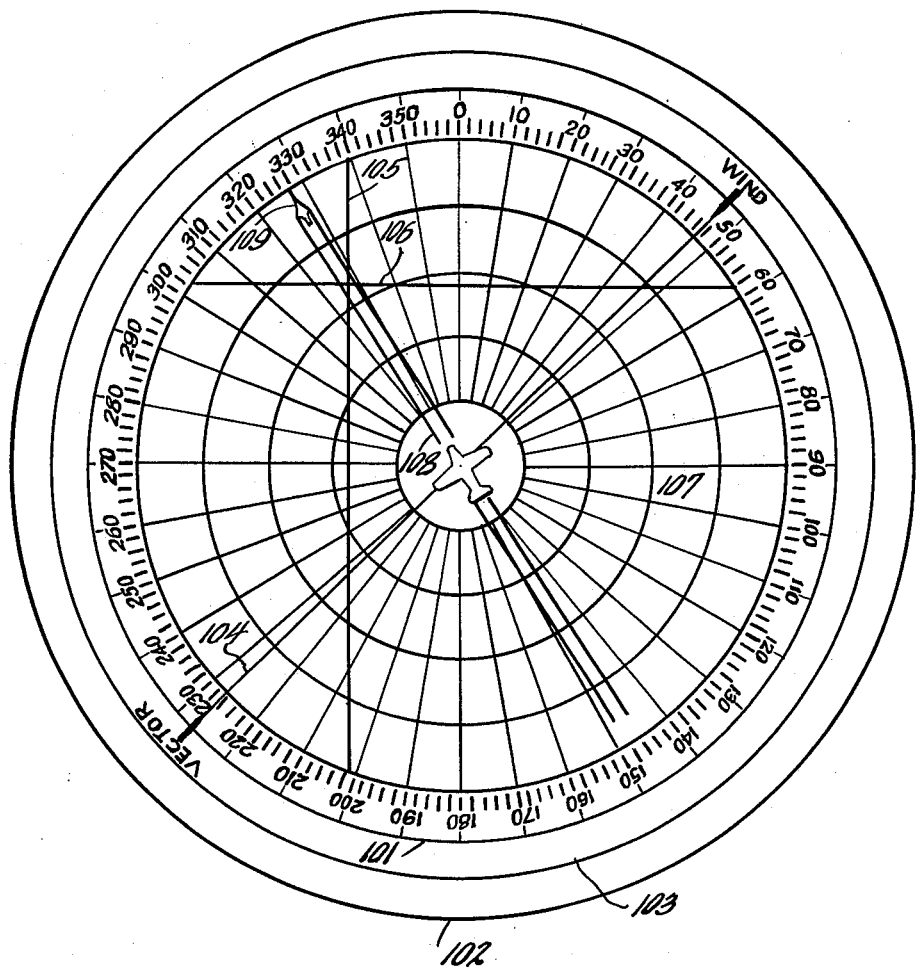

2,916,825

DISPLAY FOR A NAVIGATIONAL INSTRUMENT

James Stuart Parsons, Ottawa, Canada, assignor, by mesne assignments, to Canadian Patents and Development Limited, Ottawa, Ontario, Canada, a company Application May 8, 1953, Serial No. 353,853

3 Claims. (Cl. 33—1)

This disclosure is relevant to systems and apparatus for the presentation of information by sets of indicators on the face of an instrument, and particularly to arrangements of indicators on navigational instruments for use on aircraft. The disclosure is concerned with a display system for an instrument whereon a pair of crossed-marker indicators present information of the relative position of a reference point with respect to the aircraft, the latter being represented as stationary at the display center. By means of an apparatus of the type disclosed, a pilot is enabled to view a unitary display whereon a relative-position presentation is combined with a superimposed heading indication. The pilot is therefore informed at a glance of the relative direction with respect to a reference position in which he must steer the craft.

A pilot in a high-speed aircraft, particularly if it is of the jet-propelled type, has to exercise his capacities for observation and mental calculations almost continuously, and has little time to spend in working out navigational problems. With the urgency of making many decisions continuously pressing upon him, the pilot requires that any indicator or instrument before him should present information in such form as will make the least demands upon his concentration.

The display system set forth herein provides an arrangement of relative-position indicators cooperating with a further indicator of craft orientation or heading, so that the relative distance of a reference point, its true bearing, and the relative correspondence of the aircraft course with such bearing is immediately apparent.

Prior art devices of the type disclosed in U.S. Patent 1,985,266, dated Dec. 25, 1934, granted to R. H. Smith and J. P. W. Vest, illustrate a navigational instrument of the relative-position type, but such apparatus does not provide any means for relating a craft heading or orientation with the bearing of a reference point. If a separate compass reading of craft heading must be taken from another instrument, there is possibility of mis-reading. No direct correlation of the course being flown and of the required course to be made good can be made. In order that a pilot may use any instrument with the least effort, and if a decision made by him as a result of an observation is to have the least probability of human error, the presentation should be a clear indication of what he must do. It should also provide further, self-evident indication of the effect of his actions. For example, successful use of a relative position indicator is obtained when the information obtained at a glance instructs the pilot on how he must steer, and also shows to what extent his steering actually is effective in maintaining a planned course.

To this end, the invention is conceived as a solution of the problem of presenting information to a pilot of his position relatively to a reference point, with self-evident indication of the relation of his craft orientation or heading to the bearing of the reference point. In accordance with the invention a display arrangement of the relative-position type includes an indicator actuatable from a compass or direction-determining device, superimposed on the display and rotatable about a central axis, and an azimuth dial concentric with the display system.

In the use of a navigational instrument of the type referred to, a pilot will make a pre-flight setting of the crossed-marker indicators to a reference position, and on taking off will start the computer, so that components of motion of the craft are integrated and the reference point is caused to move relatively to the aircraft represented at the display center. If the flight is made with the intention of returning to the take-off point, the reference position would have been set to coincide with the aircraft position before taking-off. The display will, in such case, continuously present the bearing and distance to the home field, so that on returning the pilot need only to steer a course corresponding to this bearing. In short, he will "home" on the reference point shown by the crossed-markers. The azimuthal direction of the heading or orientation indicator with respect to the bearing of the intersection of the crossed-marker indicators, shows the pilot how closely the course being steered coincides with the bearing. The problem of steering is thereby simplified to a matter of keeping the craft oriented along the proper bearing, that is, generally keeping the heading pointer on the intersection of the markers. Any deviation therefrom will be self-evident as to the amount and the direction of change of course.

For a better understanding of the invention as realized in a preferred embodiment, reference should be made to the drawings taken together with the disclosure, wherein, Figure 1 is a frontal view of a display arrangement;

Figure 2 is a cross-sectional view of the arrangement shown in Figure 1, and;

Figure 3 is an "exploded" view showing the elements of Figure 2.

The display of Figure 1 comprises an azimuth dial 101 in the form of an annular disc, fixed to the frame of an instrument to appear north upwards, in map-like presentation, and the display area bounded by this dial includes sets of indicators operating with reference to the dial. The outermost ring 102 is also fixed to the instrument frame, and serves to retain and guide rotatable dial setting member in the form of an annular disc or cursor ring 103 which indicates the direction of an applied setting inserted into the instrument. Cursor ring 103 has a diametrically inscribed marker 104 which may be either a marked groove in a transparent sheet or a filament or wire stretched across an annular disc. One end of the marker is indexed and labelled "Wind," the other "Vector." It will be readily apparent from Figs. 1 and 3 of the drawings that the said Wind and Vector ends of the lines 104 respectively constitute diametrically opposite radial index marks inscribed on the dial setting member or ring 103. Depending upon the simulation selected, the bearing of the marker shows the direction in which the reference point, as indicated by crossed-markers 105 and 106, will be shifted due to wind drift or a vector addition. The two crossed-marker members 105 and 106 are respectively in the form of north-south and east-west lines representing X and Y Cartesian co-ordinates of position and their distances, measured normal to their lengths from display center are scaled representations of the distance of a reference point from the aircraft. The manner of computing the position may be in accordance with any of a variety of methods known in the art for producing an indication of relative position, for example according to the methods shown in U.S. Patent 1,985,266, or as shown in my copending application 353,854, filed May 8, 1953.

A polar graticule 107 is inscribed on a sheet of thin transparent material, for example, a methyl methacrylate plastic sheet, the pattern being concentric with the azimuth dial 101 and formed as a series of equally radially spaced distance circles having radial direction lines spaced every 10 degrees of azimuth. The approximate bearing of the reference position (at the intersection of the crossed-markers) is readily estimated by interpolation between the radial lines adjacent to the point of intersection.

The heading or orientation indicator 108 is a pointer rotatable about the center of the display, and is actuated by a compass repeater or other direction transmitting device (not shown). The outline of an aircraft at the center is one example of a marker which gives instant recognition of the sense of the direction, and an arrow head 109 at one end provides an index permitting of reading the azimuth angle. As illustrated in the figure, the heading pointer is kept aligned with the intersection of the crossed-markers, by operating direction controls of the aircraft, in order to guide it "home."

The physical form which an embodiment of the invention may assume is illustrated by Figures 2 and 3. The heading or attitude pointer 108 comprises a diametrically located marker inscribed or otherwise applied to a rotatable disc 110, driven from a compass repeater or other transmission device (not shown) through shaft 111. Crossed-marker members 105 and 106 are located on the viewing side of the heading disc, and are illustrated as thin transparent strips of light strong sheet material having an edge suitably marked to contrast with the other parts of the display area. This may take the form of a blackened groove, or a white or even a self-luminous edge may be employed, to provide a visible indication of the point of intersection. Blocks 114 and guide rods 115 are fixed to the instrument frame, and the strips 105 and 106 are arranged to be moved by carriage blocks 116 and 117 sliding along the guides. The carriage blocks may be actuated to represent computed displacement by known means suitable for the purpose, as for example by a lead screw, or by a thread or belt driven from outputs of a computer portion of the instrument (not shown).

Graticule 107 and azimuth dial 101 are oriented together and are fixed to the frame, there being sliding clearance for the more forward strip member 105 between it and the rear side of the graticule. While these are shown as having their markings as black lines or numbers, it is equally useful and in some instances preferable that the markings be white or even luminous.

Control member 112 and gear 113 are both fixed to shaft 118, whereby a resolver or equivalent device may be adjusted in accordance with the azimuthal angle of the wind, or of a vector representing a desired shift of reference point. Idler gear 119 transmits the rotation of gear 113 to the dial setting member 103, shown as a cursor ring rotating about the center of the display. This member is retained in position by ring 102 fixed to the frame, and the sense of the rotation is the same as that of the control. The marker 104 carried by cursor ring 103 may be a groove in a thin disc of transparent material, or a wire stretched across a diameter. It is useful in presenting an impression of the effect of either the wind or of a vector shift, in setting the aircraft off its course, the off-setting being along the direction of line 104.

While the elements which make up the indicators have been described herein as being assembled in a certain order with respect to the viewing side, it is to be understood that numerous variations in the relationship of such elements may be made without exceeding the teachings of the invention.

It is also possible according to the invention to realize other embodiments of a set of indicators on a display than the mechanical devices described herein. For example, it will be clearly equivalent to combine on a display luminous or shadow indications optically projected from a projector wherein images are actuated according to changes of distance or angle. It is equally within the teachings of the invention to arrange a unitary display of a set of indications traced by an electron beam on a luminescent screen, whereon lines 105, 106, and 108 shown in Figure 1 are produced by deflection and brightening means.

The embodiments of the invention in which an exclusive property or privilege is claimed are defined as follows:

1. A display for a navigational instrument comprising a frame-supported azimuth dial in the form of an annular disc member having a calibrated azimuth circle inscribed on the front face thereof, a pair of thin transparent rectangular strip members disposed at right angles to each other adjacent to the rear face of the disc member and constrained to move in directions perpendicular to their own length in representation respectively of north-south and east-west components of motion of a craft to indicate a reference position at the crossing of line markers inscribed along said strips, a heading-indicating disc positioned adjacent to and rearwardly of the strip members, coaxially rotatable with respect to the azimuth disc member, and having marking indicia inscribed along a diameter thereof to indicate the craft heading direction, and means to rotate the heading disc with respect to the azimuth dial member to represent geographic direction of craft motion, whereby the relative correspondence of the heading direction with the direction along which the reference position lies relatively to display center may be visibly evident, a transparent graticule fixed to the azimuth disc member and comprising a pattern of regularly radiating radial lines and a series of concentric distance circles superimposed on a display center, and a coaxial rotatable dial setting member in the form of an annular disc having diametrically opposite radial index marks inscribed thereon, in indicating relationship with the calibrations of the azimuth disc member.

2. A display for a navigational instrument comprising a frame-supported azimuth dial in the form of an annular disc member having a calibrated azimuth circle inscribed on the front face thereof, a pair of thin transparent rectangular strip members disposed at right angles to each other adjacent to the rear face of the disc member and constrained to move in directions perpendicular to their own length in representation respectively of north-south and east-west components of motion of a craft to indicate a reference position at the crossing of line markers inscribed along said strips, a heading-indicating disc positioned adjacent to and rearwardly of the strip members, coaxially rotatable with respect to the azimuth disc member, and having marking indicia inscribed along a diameter thereof to indicate the craft heading direction, and means to rotate the heading disc with respect to the azimuth dial member to represent geographic direction of craft motion, whereby the relative correspondence of the heading direction with the direction along which the reference position lies relatively to display center may be visibly evident, a transparent graticule fixed to the azimuth disc member and comprising a pattern of regularly radiating radial lines and a series of concentric distance circles superimposed on a display center, a coaxial rotatable dial setting member in the form of an annular disc having diametrically opposite radial index marks inscribed thereon, in indicating relationship with the calibrations of the azimuth disc member, the radial index marks relating respectively to wind direction and vector direction, and manual control means for rotating the dial setting member.

3. A display for a navigational instrument comprising a frame-supported azimuth dial in the form of an annular disc member having a calibrated azimuth circle inscribed on the front face thereof, a pair of thin transparent rectangular strip members disposed at right angles to each other adjacent to the rear face of the disc member and constrained to move in directions perpendicular to their own length in representation respectively of north-south and east-west components of motion of a craft to indicate a reference position at the crossing of line markers inscribed along said strips, a heading-indicating disc positioned adjacent to and rearwardly of the strip members, coaxially rotatable with respect to the azimuth disc member, and having marking indicia inscribed along a diameter thereof to indicate the craft heading direction, and means to rotate the heading disc with respect to the azimuth dial member to represent geographic direction of craft motion, whereby the relative correspondence of the heading direction with the direction along which the reference position lies relatively to display center may be visibly evident, a transparent graticule fixed to the azimuth disc member and comprising a pattern of regularly radiating radial lines and a series of concentric distance circles superimposed on a display center and the heading-indicating disc being in the form of an opaque member having on the viewing face a pattern of markings indicative of heading direction, the markings having greater reflectivity to ambient illumination than the opaque member.

References Cited in the file of this patent

UNITED STATES PATENTS

| | | |
|---|---|---|
| 2,360,361 | Mountbatten | Oct. 17, 1944 |
| 2,361,956 | Moseley | Nov. 7, 1944 |
| 2,541,277 | Omberg et al. | Feb. 13, 1951 |
| 2,566,247 | Pierce et al. | Aug. 28, 1951 |
| 2,569,328 | Omberg | Sept. 25, 1951 |
| 2,571,038 | Hogberg | Oct. 9, 1951 |
| 2,613,352 | Kellogg | Oct. 7, 1952 |
| 2,614,251 | Ergen | Oct. 14, 1952 |
| 2,618,856 | Sweet | Nov. 25, 1952 |
| 2,670,414 | White | Feb. 23, 1954 |
| 2,756,929 | McGee | July 31, 1956 |

FOREIGN PATENTS

| | | |
|---|---|---|
| 108,262 | Australia | Aug. 24, 1939 |